United States Patent
Jiang et al.

(10) Patent No.: US 12,141,153 B2
(45) Date of Patent: Nov. 12, 2024

(54) METHOD, APPARATUS AND DEVICE USED TO SEARCH FOR CONTENT

(71) Applicant: BAIDU ONLINE NETWORK TECHNOLOGY (BEIJING) CO., LTD., Beijing (CN)

(72) Inventors: Fuchun Jiang, Beijing (CN); Wei Lu, Beijing (CN); Li Shi, Beijing (CN); Jindong Wang, Beijing (CN); Ping Pan, Beijing (CN); Shiqi Zhao, Beijing (CN); Huaiwen Yuan, Beijing (CN); Cihang Jin, Beijing (CN); Bin Wang, Beijing (CN); Yulong Ou, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 12 days.

(21) Appl. No.: 17/914,557

(22) PCT Filed: Sep. 23, 2020

(86) PCT No.: PCT/CN2020/117129
§ 371 (c)(1),
(2) Date: Sep. 26, 2022

(87) PCT Pub. No.: WO2021/196541
PCT Pub. Date: Oct. 7, 2021

(65) Prior Publication Data
US 2023/0147941 A1    May 11, 2023

(30) Foreign Application Priority Data
Apr. 1, 2020    (CN) .......................... 202010252907.2

(51) Int. Cl.
*G06F 16/2457*    (2019.01)
*G06F 16/2453*    (2019.01)
(Continued)

(52) U.S. Cl.
CPC .... *G06F 16/24578* (2019.01); *G06F 16/9535* (2019.01)

(58) Field of Classification Search
CPC ........... G06F 16/24578; G06F 16/9535; G06F 16/24539; G06F 16/3326; G06F 16/3349; G06F 16/9536
See application file for complete search history.

(56) References Cited

U.S. PATENT DOCUMENTS

| 2006/0224583 A1 | 10/2006 | Fikes et al. |
| 2008/0222125 A1 | 9/2008 | Chowdhury |

(Continued)

FOREIGN PATENT DOCUMENTS

| CA | 2795569 A1 | 5/2013 |
| CN | 102419776 A | 4/2012 |

(Continued)

OTHER PUBLICATIONS

Office Action for Chinese Application 202010252907.2, dated Jun. 26, 2023, 14 pages.

(Continued)

*Primary Examiner* — Robert W Beausoliel, Jr.
*Assistant Examiner* — Mohammad S Bhuyan
(74) *Attorney, Agent, or Firm* — Lippes Mathias LLP

(57) ABSTRACT

A method, apparatus and device used to search for content, and a computer-readable storage medium, which relate to the field of data processing. In the method, in response to receiving a search request for a target search term, obtain multiple historical search records related to multiple historical search requests, each historical search record comprising the historical search term targeted by the corresponding historical search request. Then, determine a first historical search record matching the target search term from the multiple historical search records. Furthermore, based on the (Continued)

relationship between multiple historical search records, determine from the multiple historical search records a second historical search record associated with the first historical search record. The method further comprises determining an extended result for the target search term on the basis of the search result corresponding to the second historical search record. By means of the method, it is possible to provide extended results that may meet the search request of users, which improves the quality and effect of a search, and improves the user experience.

19 Claims, 6 Drawing Sheets

(51) Int. Cl.
  *G06F 16/33* (2019.01)
  *G06F 16/332* (2019.01)
  *G06F 16/9535* (2019.01)
  *G06F 16/9536* (2019.01)

(56) References Cited

U.S. PATENT DOCUMENTS

| | | | | |
|---|---|---|---|---|
| 2011/0060733 | A1* | 3/2011 | Peng | G06F 16/9535 707/723 |
| 2011/0219015 | A1 | 9/2011 | Kim et al. | |
| 2012/0203751 | A1* | 8/2012 | Srivastava | G06F 16/24575 707/706 |
| 2013/0080162 | A1 | 3/2013 | Chang et al. | |
| 2014/0358971 | A1* | 12/2014 | Aminzade | G06F 16/9537 707/E17.014 |
| 2016/0140230 | A1 | 5/2016 | Villeneuve et al. | |
| 2016/0306887 | A1* | 10/2016 | Li | G06F 16/954 |
| 2020/0250197 | A1* | 8/2020 | Yang | G06F 16/24578 |

FOREIGN PATENT DOCUMENTS

| | | |
|---|---|---|
| CN | 103049495 A | 4/2013 |
| CN | 103577489 A | 2/2014 |
| CN | 103593410 A | 2/2014 |
| CN | 103617266 A | 3/2014 |
| CN | 104462325 A | 3/2015 |
| CN | 105335391 A | 2/2016 |
| CN | 106096003 A | 11/2016 |
| CN | 106372231 A | 2/2017 |
| CN | 109101658 A | 12/2018 |
| CN | 110245357 A | 9/2019 |
| CN | 111475725 A | 7/2020 |
| JP | H10233517 A | 9/1998 |
| JP | 2010122932 A | 6/2010 |
| JP | 2010198577 A | 9/2010 |
| JP | 2011138248 A | 7/2011 |
| JP | 2011221979 A | 11/2011 |
| JP | 2017045196 A | 3/2017 |
| KR | 20130033693 A | 4/2013 |
| WO | 2010151394 A2 | 12/2010 |

OTHER PUBLICATIONS

Office Action for Japanese Application 2022-553192, dated Aug. 29, 2023, 23 pages.
Liu, Zuopeng; "Research on synonym search and leakage-resilient in SSE"; Department of Computer Science and Engineering School of Electronic Information and Electrical Engineering; Shanghai Jiao Tong University; May 25, 2015; 84 pages; Abstract.
Lie, Mei-Qi, et al.; "Search optimization of P2P system based on SFP-tree"; Journal of Sichuan University (Natural Science Edition); vol. 46 No. 6: Nov. 30, 2009; 7 pages; Abstract.
Chen, Shaoming, et al.; "Extracting query expansion terms based on user's search behavior"; 2009 Second International Symposium on Computational Intelligence and Design; Dec. 31, 2009; 4 pages.
International Search Report for Application No. PCT/CN2020/117129, Mailed Dec. 31, 2020, 4 pages.
Office Action for CN202010252907.2, dated Dec. 28, 2022, 9 pages.
Search Report for European Application No. 20929634.2, dated Mar. 21, 2024, 7 pages.

* cited by examiner

METHOD, APPARATUS AND DEVICE USED TO SEARCH FOR CONTENT

This application is a U.S. national phase application of International patent application No. PCT/CN2020/117129, filed on Sep. 23, 2020, which is based on and claims a priority to China Patent Application Serial No. 202010252907.2, filed on April, 2020, the entire contents of which are incorporated herein by reference for all purposes.

TECHNICAL FIELD

The disclosure generally relates to the field of data processing, and more particularly, to a method, an apparatus and a device for searching for content, and a computer-readable storage medium.

BACKGROUND

With the rapid development of information technology, many users and websites provide a large amount of accessible information. However, due to the increasing amount of data provided by websites, it is difficult for a single user to go to various websites or information sources to search for relevant information.

In order to solve the difficulty of information retrieval, many search engines are used to help searching for information. The search engine collects various information from a large number of websites and saves the information locally, and then processes the information to generate various information databases. When the user wants to search for content, the content can be easily and quickly obtained by entering the search content in the search engine. However, there are still many problems that need to be solved in the process of using the search engine to search for content.

SUMMARY

Embodiments of the disclosure provide a technical solution for searching for content.

According to a first aspect of the disclosure, a method for searching for content is provided. The method includes: in response to receiving a search request for a target search term, obtaining a plurality of historical search records related to a plurality of historical search requests, each historical search record including a historical search term targeted by the corresponding historical search request; determining a first historical search record matching the target search term from the plurality of historical search records; determining a second historical search record associated with the first historical search record from the plurality of historical search records based on a relationship among the plurality of historical search records; and determining extended results for the target search term based on search results corresponding to the second historical search record.

According to a second aspect of the disclosure, an electronic device is provided. The electronic device includes: one or more processors and a memory storing one or more programs. When the one or more programs are executed by the one or more processors, the one or more processors are caused to implement the method according to the first aspect of the disclosure.

According to a third aspect of the disclosure, a non-transitory computer-readable storage medium having computer programs stored thereon is provided. When the computer programs are executed by a processor, the method according to the first aspect of the disclosure is implemented.

BRIEF DESCRIPTION OF THE DRAWINGS

The above and additional features, advantages and aspects of various embodiments of the disclosure will become more apparent when taken in combination with the accompanying drawings and with reference to the following detailed description. In the drawings, the same or similar reference numbers refer to the same or similar elements, in which.

DETAILED DESCRIPTION

Figure 1:
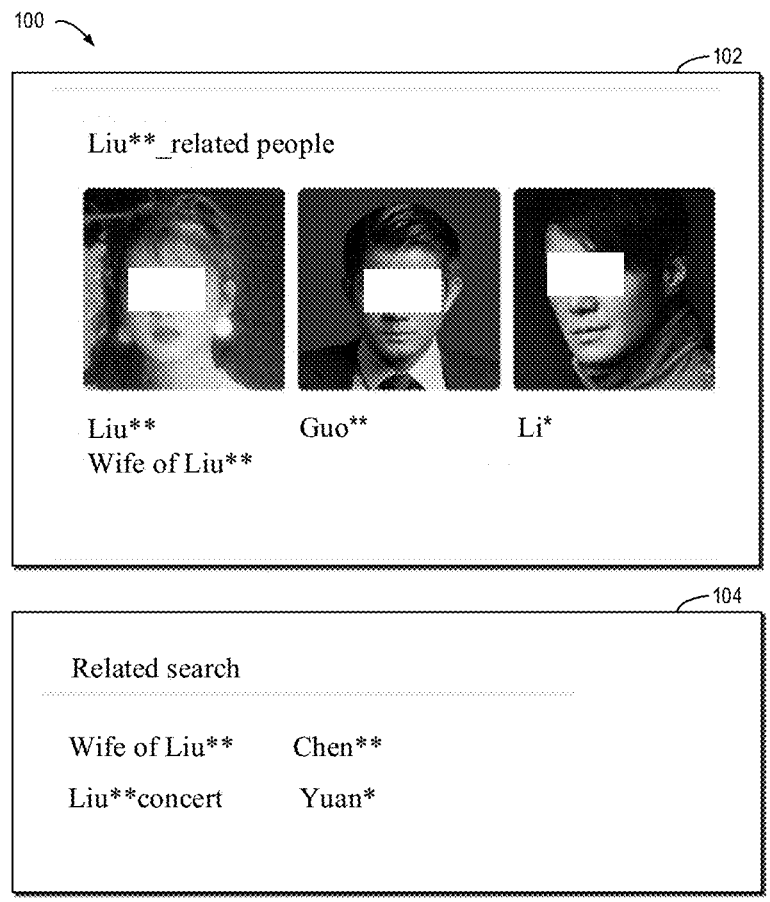
FIG. 1 is a schematic diagram of an example 100 of providing recommended results according to a conventional solution.

Embodiments of the disclosure will be described in detail below with reference to the accompanying drawings. Although certain embodiments of the disclosure are shown in the drawings, it should be understood that the disclosure may be embodied in various forms and should not be construed as limited to the embodiments set forth herein, but rather are provided for the purpose of a more thorough and complete understanding of the disclosure. It should be understood that the drawings and embodiments of the disclosure are only for exemplary purposes, and are not intended to limit the protection scope of the disclosure.

In the description of embodiments of the disclosure, the term "including" and the like should be understood as open inclusion, i.e., "including but not limited to". The term "based on" should be understood as "based at least partially on". The term "an embodiment" or "the embodiment" should be understood as "at least one embodiment". The terms "first", "second" and the like may refer to different or the same objects. Other explicit and implicit definitions may also be included below.

A user inputs a search term in a search engine, and the search engine performs a searching in a web page library. The search engine then obtains results matching the search term, sorts the results and returns the results to the user. In addition to the information requirements clearly expressed by the search term, the user often have some related information requirements at the same time. Traditional search engine products all have a certain recommendation function to recommend relevant search terms for the current search term, so as to meet the relevant information requirements of the user. For example, FIG. 1 is a schematic diagram of an example 100 in which a conventional solution provides recommended search terms. Two recommendation boxes 102 and 104 are provided after the user enters "Liu**" in the search engine. Some recommended search terms are provided in box 102 and some recommended search terms are also provided in box 104.

However, the recommended search terms given by the conventional solution cannot directly meet the relevant requirements of the user, and the user needs to click on the search term and manually select file resources that can meet the requirements in the new search page. In addition, the text length of the search term in the conventional solution is generally short, which is less attractive as recommended content, and the search terms are generated by means of user-generated content, so it is difficult to control the quality and security.

According to an embodiment of the disclosure, an improved solution for searching for content is proposed. In this solution, when a search request for a target search term is received, a plurality of historical search records related to a plurality of historical search requests are obtained, wherein each historical search record includes a historical search term targeted by the corresponding historical search request. Then, a first historical search record matching the target search term is determined from the plurality of historical search records. Afterwards, a second historical search record associated with the first historical search record is determined from the plurality of historical search records based on a relationship among the plurality of historical search records. Then, extended results for the target search term are determined based on search results corresponding to the second historical search record. Through this method, it is possible to provide the extended results that can meet the user's search requirements, thereby improving the search quality and effect, and improving the user experience.

Figure 2:
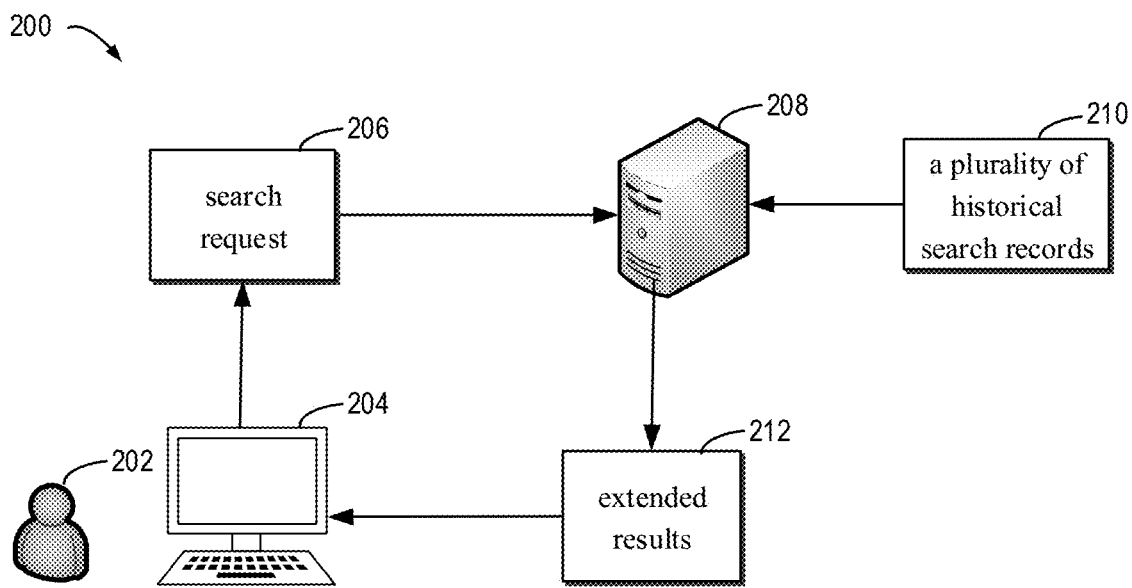
FIG. 2 is a schematic diagram of an environment 200 in which embodiments of the disclosure can be implemented.

FIG. 2 is a schematic diagram of an environment 200 in which embodiments of the disclosure can be implemented. In the example environment 200, a terminal device 204 and a computing device 208 are included. The computing device 208 provides a user 202 with extended results 212 for a search request 206 based on the search request 206 from the terminal device 204.

The terminal device 204 may run an application or program for searching, such as a search engine application. The terminal device 204 receives the target search term input by the user 202, for example, the user 202 inputs "how much is the Mercedes-Benz C200". Then the terminal device 204 generates the search request 206 for the target search term and sends the search request 206 to the computing device 208.

The terminal device 204 includes, but is not limited to, a personal computer, a server computer, a handheld or laptop device, a mobile device (such as a mobile phone, a personal digital assistant (PDA) and a media player), a multiprocessor system, a consumer electronics product, a minicomputer, a mainframe computer, and a distributed computing environment including any of the above systems or devices.

The computing device 208 includes, but is not limited to, a personal computer, a server computer, a handheld or laptop device, a multiprocessor system, a consumer electronic device, a minicomputer, a mainframe computer, a distributed computing environment including any one of the above systems or devices, a virtual machine in a cloud platform or other computing devices.

After the computing device 208 receives the search request 206 from the terminal device 204, the computing device 208 not only generates search results for the target search term in the search request 206, but also obtains the extended results 212 from the computing device 208 based on the target search term of the search request 206. For the plurality of historical search records 210 obtained by the computing device 208, the matched historical search records are searched for by matching the target search term with the historical search terms in the plurality of historical search records 210.

FIG. 2 shows that the computing device 208 receives the plurality of historical search records 210 from other devices, which is merely an example and not a specific limitation of the disclosure. The plurality of historical search records 210 may also be generated in the computing device 208 or by the computing device 208 upon receipt of the search request 206.

The plurality of historical search records 210 are determined from log data in a search log. Each historical search record in the plurality of historical search records 210 includes a historical search term targeted by the corresponding historical search request. In some embodiments, each historical search term further includes a key entity, and the key entity is determined by performing entity identification on the historical search term in the log data, and obtaining from multiple identified entities based on an occurrence number of each entity in the historical search terms. Alternatively or additionally, each historical search term also includes a category of requirement corresponding to the historical search term. In some embodiments, each historical search record includes, in addition to the historical search term, historical search terms associated with the historical search term, and a degree of association between the historical search term and the associated historical search term.

In some embodiments, the computing device 208 searches the plurality of historical search records 210 for the same historical search term as the target search term, for example, searches the historical search records for the historical search term of "how much is the Mercedes-Benz C200". In some embodiments, the computing device 208 searches the plurality of historical search records 210 for historical search terms having a matching degree with the target search term greater than a degree threshold. The above examples are only used to describe the disclosure, but not to specifically limit the disclosure.

When the computing device 208 finds the first historical search record matching the target search term, the computing device 208 also obtains the relationship among the plurality of historical search records 210. Then, the computing device 208 determines the second historical search record associated with the first historical search record based on the relationship among the records, for example, the historical search term in the second historical search record is "photos of Mercedes-Benz C200". Alternatively or additionally, the computing device 208 may also determine one or more other historical search records. In some embodiments, the relationship among the plurality of historical search records is a degree of correlation among the plurality of categories of the plurality of historical search records. In some embodiments, the relationship among the plurality of historical search records is the degree of association among the plurality of historical search records.

The computing device 208 obtains the extended results 212 based on the historical search term of the second historical search record. Then the computing device 208 provides the user 202 with the extended results 212 and/or the target search results for the target search term.

Figure 3:
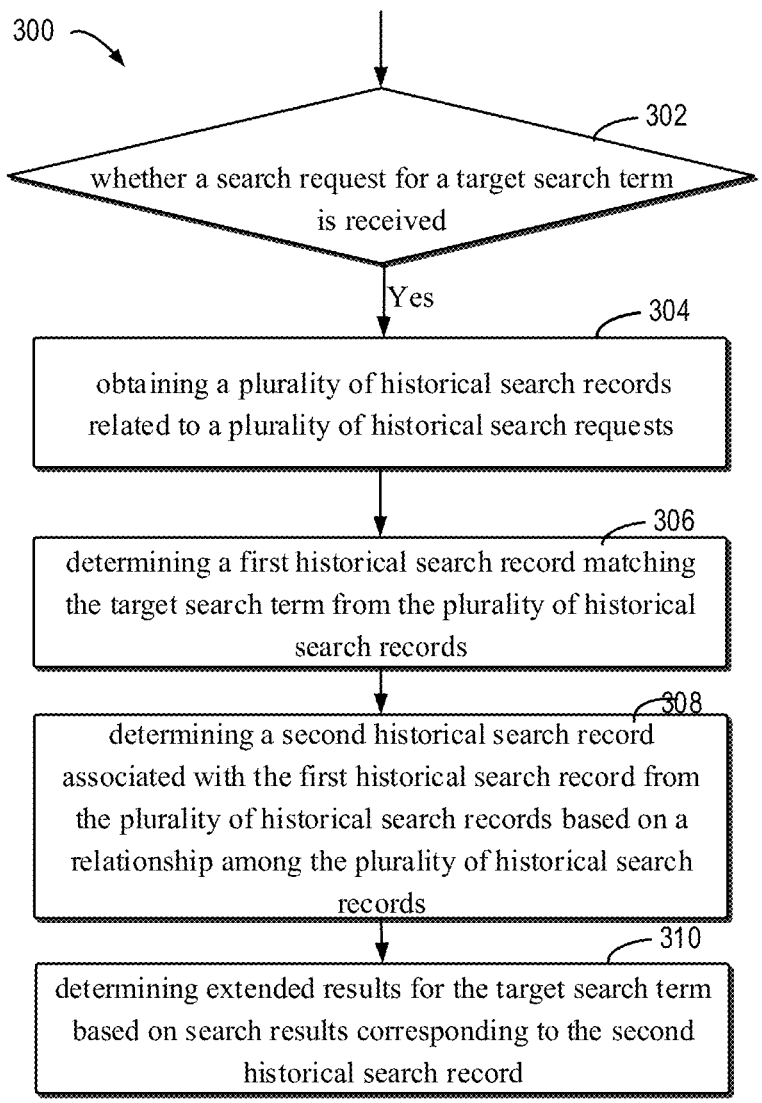
FIG. 3 is a flowchart of a method 300 for searching for content according to embodiments of the disclosure.

FIG. 2 is a schematic diagram of an environment 200 in which embodiments of the disclosure can be implemented. FIG. 3 is a flowchart of a method 300 for searching for content according to embodiments of the disclosure. The method 300 may be implemented by the computing device 208 in FIG. 2 or any other suitable device.

At block 302, the computing device 208 determines whether the search request 206 for the target search term is received. Upon receipt of the search request 206, at block 304, the computing device 208 obtains the plurality of historical search records 210 related to the plurality of historical search requests. Each historical search record includes the historical search term targeted by the corresponding historical search request.

In some embodiments, each historical search record of the plurality of historical search records 210 includes a historical search term. In some embodiments, each historical search record in the plurality of historical search records 210 includes a historical search term and a key entity corresponding to the historical search term. In some embodiments, each historical search record of the plurality of historical search records 210 includes a historical search term and a key entity corresponding to the historical search term and its corresponding requirement category. In some embodiments, each historical search record of the plurality of historical search records 210 includes a historical search term, a corresponding historical search term, and a degree of association between the historical search term and the corresponding historical search term. The above examples are only used to describe the disclosure, but not to specifically limit the disclosure.

In some embodiments, the plurality of historical search records 210 are obtained by the computing device 208 from other servers or computers. In some embodiments, the plurality of historical search records 210 are already generated in the computing device 208. In some embodiments, the plurality of historical search records 210 are generated online by the computing device 208 at the time of the retrieval by the user 202. The process by which the computing device 208 obtains the plurality of historical search records 210 is described in combination with FIG. 4.

At block 306, the computing device 208 determines, from the plurality of historical search records 210, the first historical search record that matches the target search term. After obtaining the plurality of historical search records 210 and the target search term, the computing device 208 searches the plurality of historical search records 210 for the first historical search record that matches the target search term. In some embodiments, the target search term is identical to the historical search term in the first historical search record. In some embodiments, the matching degree of the target search term with the historical search term in the first historical search record is greater than a preset matching threshold. The above examples are only used to describe the disclosure, but not to limit the disclosure.

At block 308, the computing device 208 determines the second historical search record associated with the first historical search record from the plurality of historical search records 210 based on the relationship among the plurality of historical search records 210. In some embodiments, the computing device 208 obtains other historical search records associated with the first historical search record in addition to the second historical search record.

In some embodiments, when each historical search record in the plurality of historical search records 210 includes the historical search term and the key entity, or each historical search record includes the historical search term, the key entity and the category of the historical search record, the relationship among the plurality of historical search records 210 is the degree of association among the categories. The computing device 208 determines a second category associated with the first category of the first historical search record based on the relationship among the plurality of historical search records 210. The computing device 208 then determines from the plurality of historical search records 210, the second historical search record having the second category. The second historical search record includes the key entity of the first historical search record. Through the above method, the second historical search record with a high degree of matching can be found quickly and accurately.

For the category of each historical search record, the computing device 208 determines the categories of the plurality of historical search records 210 based on the plurality of historical search terms in the plurality of historical search records 210. The computing device 208 then determines the relationship among the plurality of historical search records 210 based on the categories. In the above manner, the categories and the relationship among the plurality of historical search records can be determined more quickly and accurately. The process of determining the categories and determining the relationship among the plurality of historical search records related to the categories are described later in combination with FIG. 5.

In some embodiments, the relationship among the plurality of historical search records 210 is obtained when the computing device 208 obtains the plurality of historical search records 210. The relationship describes the degree of association between each historical search record in the plurality of historical search records 210 and its corresponding historical search record. The computing device 208 may determine a set of historical search records associated with the first historical search record based on the relationship among the plurality of historical search records 210. There is a degree of association between the first historical search record and each historical search record in the set of historical search records. The computing device 208 then determines the second historical search record from the set of historical search records based on the degree of association. Through this method, the second historical search record with high matching degree can be found quickly and accurately. The process of determining the degree of association between each historical search record and its corresponding historical search record will be described below with reference to FIG. 6.

At block 310, the computing device 208 determines the extended results 212 for the target search term based on the search results corresponding to the second historical search record.

In some embodiments, after obtaining the second historical search record, the computing device 208 obtains the search results for the historical search term in the second historical search record. In some embodiments, the computing device 208 performs re-searching using the historical search term in the second historical search record, to obtain the search results in real time. Alternatively, in some embodiments, the computing device 208 may also search for the historical search results for the historical search term in the second historical search record. For example, the computing device 208 may search a search log for the above historical search results. It should be understood that the above examples are only used to describe the disclosure, but not to specifically limit the disclosure, and the computing device 208 may obtain the search results for the historical search term in the second historical search record in various ways.

Then, the computing device 208 determines the search results obtained from the search term in the second historical search record as the extended results 212. In this way, information suitable for the user can be quickly and automatically extended.

In some embodiments, after obtaining the second historical search record, the computing device 208 performs searching using the second historical search record to obtain the historical search results for the historical search term in the second historical search record. For example, the computing device 208 may search for the historical search results from the search log. The computing device 208 then determines a part of the historical search results that have been accessed by the user 202 from the historical search results. At this time, the computing device 208 determines the part of the historical search results as the extended results 212. In this way, the extended results 212 related to the user can be more accurately determined.

In some embodiments, after obtaining the second historical search record, the computing device 208 also obtains an information stream generated when the user 202 performs searching for the historical search term in the second historical search record. In some embodiments, the information stream is a historical information stream recorded in a log record and provided to the user when the user performs searching using the historical search term in the second historical search record. The historical information stream may be news, various network information, and push advertisements. The computing device 208 then determines, based on the information stream, the information stream that the user 202 browsed at the time of searching as the extended results 212. For example, the user 202 who performs the second historical search record also views the information stream provided by the network server when performing information searching, and then the viewed information stream is determined as the extended results 212. Alternatively or additionally, there needs to be focus point labels created by the user 202 in the viewed information stream. In this way, the sources of the extended results can be increased, to provide more extended results.

In some embodiments, after obtaining the extended results 212, the computing device 208 may provide the terminal device 204 with the extended results 212, or the computing device 208 may provide the terminal device 204 with the extended results 212 and the target search results for the target search term. In this way, the user can quickly obtain the extended results and the target search results.

In some embodiments, when providing the extended results 212 and the target search results to the user 202, the computing device 208 determines a first score for the extended result 212, the first score indicates a degree of relevance between the extended result 212 and the historical search term in the second historical search record. The score is generated by a neural network model. The score of each result is determined by inputting information such as user click distribution, user click rate estimation, title, content, length, and the historical search term of the second historical search record for each result in the extended results 212 into the neural network module. The neural network model is determined by information such as, the sample user click distribution, the sample user click rate estimation, the sample search result term, the sample search term, the title, content and length of the extended result and other information, and the sample score.

The computing device 208 also determines a second score for the target search result. The second score indicates a degree of relevance between the target search result and the target search term. The second score is the score of the target search result determined based on inputting information such as the title, content length, and the target search term of each result in the target search results into the above neural network model.

The computing device 208 determines priorities of the extended results 212 and the target search results based on the first score and the second score. The computing device 208 then provides the extended results 212 and the target search results according to the priorities. Alternatively or additionally, the computing device 208 may also place some constraints on displaying the extended results 212. For example, there may only be a first number of extended results 212 in the provided preset number of results, or the number of consecutive extended results 212 may be set. The above examples are only used to describe the disclosure, but not to specifically limit the disclosure. Those skilled in the art can set the constraints as required. Through the above method, more relevant and accurate target search results and recommended results can be provided to the user.

In some embodiments, the computing device 208 also generates a target data source for obtaining search results corresponding to the second historical search record. In some embodiments, the target data source may be generated by other device, and then the computing device 208 obtains the target data source from the other device. By generating the target data source, the quality of the target data source can be improved, so that high-quality content can be provided to the user.

In some embodiments, when generating the target data source, the computing device 208 first determines the scores of multiple files in the multiple original data sources. The score of each file indicates the quality of the file. The files can be scored by the following methods. For media site scoring method, scoring is executed based on automated link analysis methods, or based on marks of experts. For media author scoring method, scoring is executed according to author registration marked by experts, author popularity through big data analysis, author popularity synthesized through reader feedback such as likes and comments. Furthermore, the files can be scored according to the richness of media texts, pictures and videos.

Then, the computing device 208 determines files whose score exceeds a score threshold from the plurality of files as the files in the target data source. In this way, a truncation operation can be used to obtain high-quality candidate results.

Figure 4:
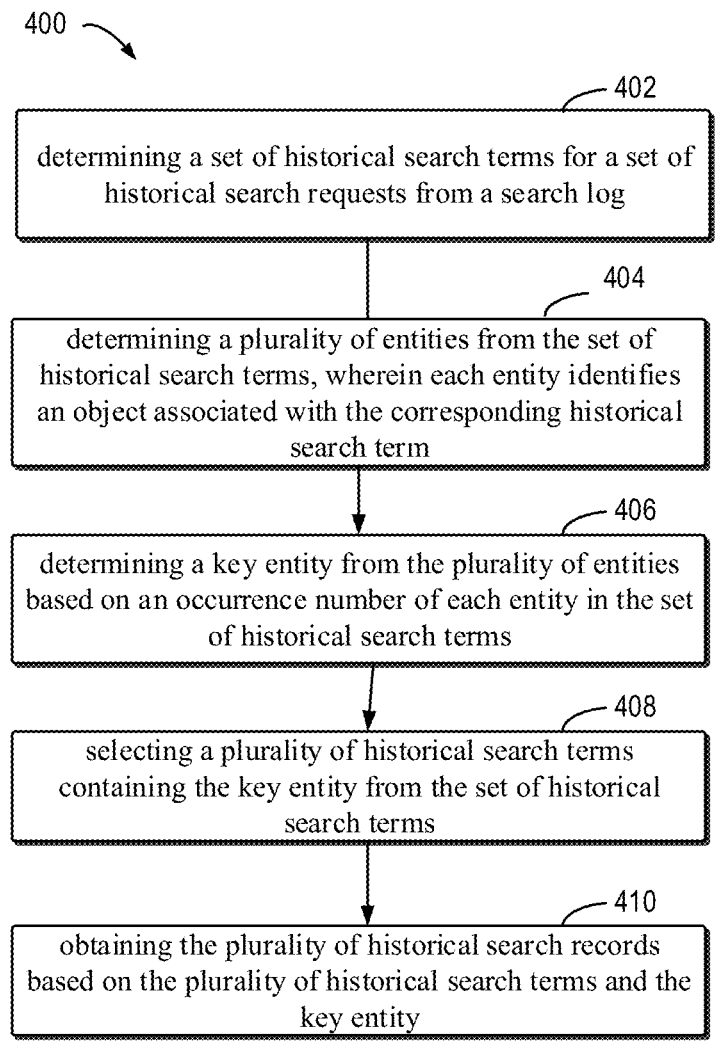
FIG. 4 is a flowchart of a method 400 for obtaining a plurality of historical search records according to embodiments of the disclosure.

FIG. 3 is a flowchart of a method 300 for searching for content according to embodiments of the disclosure. In the following, the process of obtaining a plurality of historical search records at block 304 is described in combination with FIG. 4. FIG. 4 is a flowchart of a method 400 for obtaining multiple historical search records according to embodiments of the disclosure. The method 400 of FIG. 4 may be executed by the computing device 208 of FIG. 2 or any other suitable device.

At block 402, the computing device 208 determines a set of historical search terms for a set of historical search requests from a search log. Generally, the search log stores search log terms of all users. Thus, the set of historical search terms can be determined from the search log.

At block 404, the computing device 208 determines a plurality of entities from the set of historical search terms, in which each entity identifies an object associated with the corresponding historical search term. The computing device 208 may perform entity identification, for example, through a named entity identification method, on each historical search term in the set of historical search terms.

At block 406, the computing device 208 determines a key entity from the plurality of entities based on an occurrence number of each entity in the set of historical search terms.

In some embodiments, the computing device 208 determines a historical search term group from the set of historical search terms. The historical search term in the historical search term group contains a single entity. The computing device 208 then determines, from the historical search term group, at least one historical search term. The single entity contained in the at least one historical search term has an occurrence number in the historical search term group greater than a first threshold. The computing device 208 determines the single entity in the at least one historical search term as the key entity. In this way, the key entity can be quickly and accurately identified.

For example, if an occurrence number of historical search terms including the entity of "Mercedes-Benz C200" in the set of historical search terms is 4, and the first threshold is 3, then "Mercedes-Benz C200" can be determined as the key entity.

In some embodiments, when determining the key entity, the computing device 208 determines in the plurality of entities, a high frequency entity having an occurrence number greater than a second threshold based on the occurrence number of each of the plurality of entities in the set of historical search terms. The computing device 208 determines the high frequency entity as the key entity in response to determining that a weight of the high frequency entity in the corresponding historical search term exceeds a weight threshold, in which the weight indicates an importance of the high frequency entity in the corresponding historical search term. Through the above method, the key entity can be quickly and accurately determined.

In some embodiments, the computing device 208 determines the weight according to a position of the high frequency entity in the corresponding historical search term. In some embodiments, the computing device 208 determines the weight according to a relationship between a length of the high frequency entity and a length of the corresponding historical search term. In some embodiments, the computing device 208 determines the weight according to a combination of the methods described above and any other suitable information. The above examples are only for describing the disclosure, rather than specifically limiting the disclosure, and the weight may also be obtained by combining the above methods or in other methods. Through the above method, the weight can be determined accurately and quickly.

At block 408, the computing device 208 selects a plurality of historical search terms including the key entity from the set of historical search terms. After determining the key entity, the computing device 208 determines only historical search terms that include the key entity based on the key entity.

At block 410, the computing device 208 generates a plurality of historical search records 210 based on the plurality of historical search terms and the key entity. At this time, each historical search record in the plurality of historical search records 210 includes at least the historical search term and its corresponding key entity.

In some embodiments, the above plurality of historical search records 210 may be generated by other devices according to the search log, and the computing device 208 receives the plurality of historical search records 210 from other devices.

Through the above method, the plurality of historical search records including the key entities can be quickly and accurately determined from the search log, so that the recommended results can be more accurate.

Figure 5:
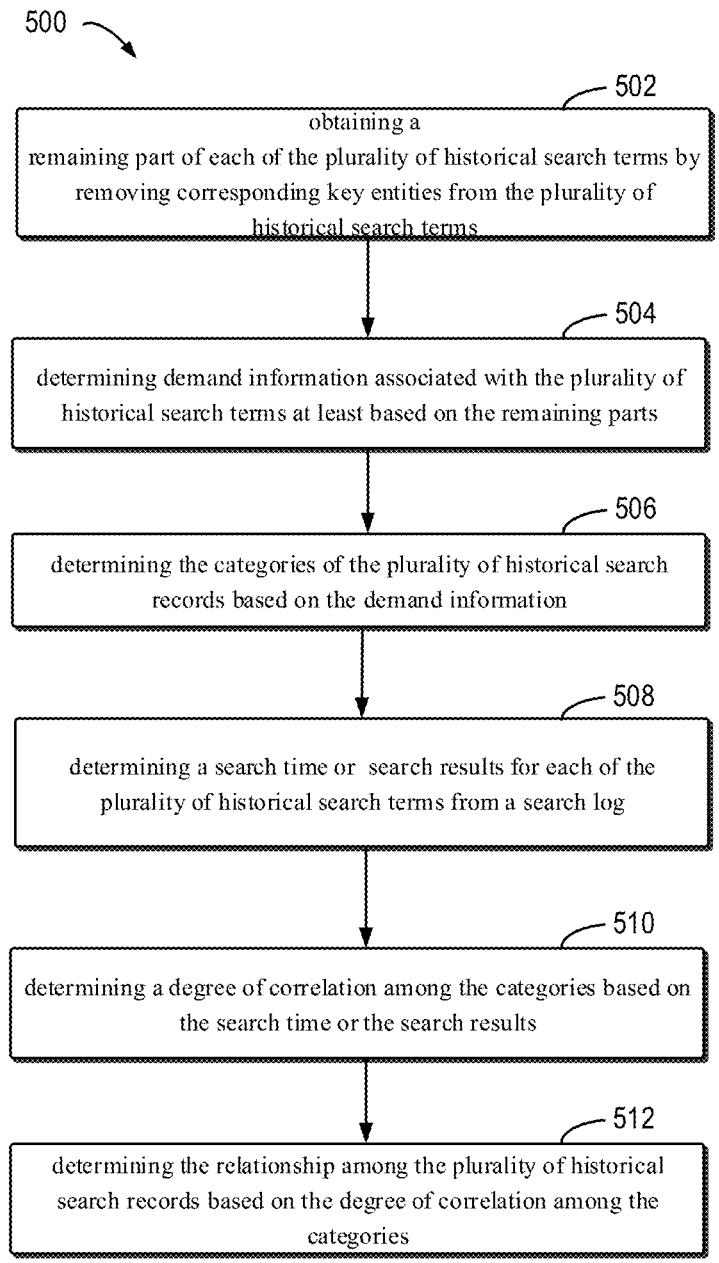
FIG. 5 is a flowchart of a method 500 for determining categories and a correspondence relationship of historical search records according to embodiments of the disclosure.

FIG. 4 is a flowchart of a method 400 for obtaining a plurality of historical search records according to embodiments of the disclosure. The process of determining categories of the historical search records and the relationship among the historical search records at block 308 in FIG. 3 is described in detail below in combination with FIG. 5. FIG. 5 is a flowchart of a method 500 for determining categories and relationship of historical search records according to embodiments of the disclosure. The method 500 of FIG. 5 may be executed by the computing device 208 of FIG. 2 or any other suitable device.

At block 502, each of the plurality of historical search records 210 includes the key entity in addition to the historical search term. The computing device 208 obtains a remaining part of each of the plurality of historical search terms by removing the key entity from the plurality of historical search terms. For example, when the historical search terms are "How much is Mercedes-Benz C200", "Price of Mercedes-Benz C200" and "Picture of Mercedes-Benz C200", and the key entity is "Mercedes-Benz C200", the remaining parts are "How much is", "price of" and "picture of".

At block 504, the computing device 208 determines demand information associated with the plurality of historical search terms at least based on the remaining parts. The computing device 208 determines the remaining parts as the user's demand information, for example, the remaining parts "How much is", "price of" and "picture of" are determined as the demand information.

At block 506, the computing device 208 determines the categories of the plurality of historical search records 210 based on the demand information. In some embodiments, the computing device 208 adopts a clustering operation to process the demand information, so as to determine the categories of the plurality of historical search records 210. For example, a k-means method is adopted to process the demand information. In some embodiments, the computing device 208 may also determine the category of the demand information by other suitable means, such as manual classification. The above examples are only used to describe the disclosure, but not to specifically limit the disclosure.

Through the above method, the demand categories of the historical search terms can be accurately determined, and the classification of the historical search records is also realized.

At block 508, the computing device 208 determines a search time or search results for each of the plurality of historical search terms from a search log. After each category is determined, the computing device 208 needs to determine the association relationship between the various categories. Therefore, the computing device 208 determines the log records for the plurality of historical search terms from the search log, and then determine the recorded search time and search results from the log.

At block 510, the computing device 208 determines a degree of correlation among the categories based on the search time or the search results. If in the log, there are two historical search records of the same user within a predetermined time period belonging to different categories, the computing device 208 determines that the degree of correlation between the two categories is increased by 1. Alternatively or additionally, the key entity of the historical search terms of the two historical search records are the same. For example, if the user 202 searches for "price of Mercedes-Benz C200" and "picture of Mercedes-Benz C200" within a predetermined time period, it can be determined that the degree of correlation between the category corresponding to "price" and the category corresponding to "picture" is 1. By analogy, the degree of correlation among multiple categories can be determined.

At block 512, the computing device 208 determines the relationship among the plurality of historical search records 210 based on the degree of correlation among the categories. The relationship among the plurality of historical search records 210 can be determined through the degree of correlation among the categories. For example, when a historical search record has a first category, one or more other categories having a higher degree of correlation therewith can be determined based on the first category, and then other historical search records associated with the historical search record can be determined based on the key entity of the first historical search record in combination with one or more other categories.

Through the above method, the degree of correlation among the categories can be quickly and accurately determined, so that the accuracy of the recommended results can be ensured when searching.

Figure 6:
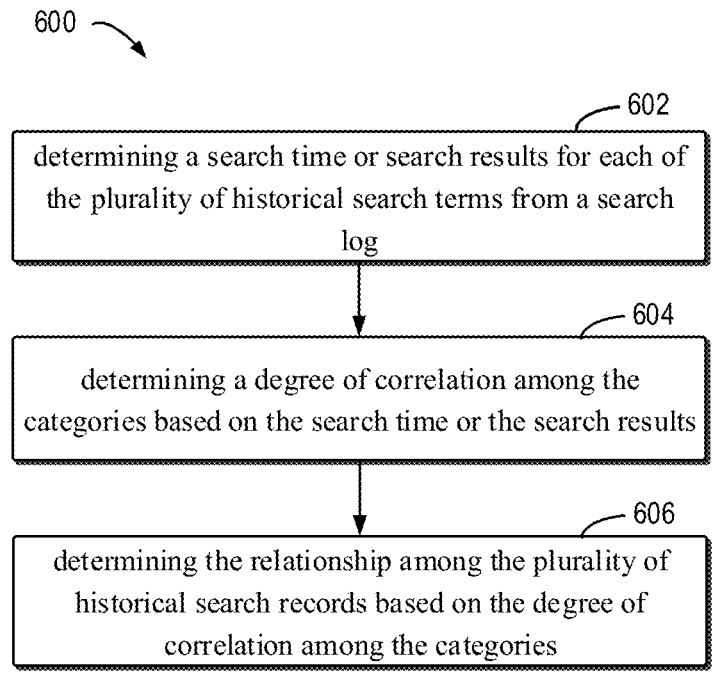
FIG. 6 is a flowchart of a method 600 for determining a relationship among historical search records according to embodiments of the disclosure.

FIG. 5 is a flowchart of a method 500 for determining categories and relationship of historical search records according to embodiments of the disclosure. The process of determining the relationship among the plurality of historical search records at block 308 in FIG. 3 is described in detail below in combination with FIG. 6. FIG. 6 is a flowchart of a method 600 for determining the relationship among the plurality of historical search records according to embodiments of the disclosure. The method 600 in FIG. 6 may be executed by the computing device 208 in FIG. 2 or any other suitable device.

At block 602, the computing device 208 determines a search time or search results for each of the plurality of historical search terms from the search log. The search log stores the search log terms of many users, and the search time and search results of the plurality of historical search terms can be determined through the search log terms.

At block 604, the computing device 208 determines a degree of association among the plurality of historical search records 210 based on the search time or the search results. The computing device 208 determines that there is a correlation between two search records when the same user searches for the two search terms within a predetermined time period or the search results of the two search terms have the same result term. For example, if the user 202 searches for two historical search terms within a predetermined period, the degree of association between the two historical search records including the two search terms may be increased by 1. If there are a predetermined number of identical result terms in the search results corresponding to the two historical search terms, the degree of association between the two historical search records may be increased by 1. The above examples are only used to describe the disclosure, but not to specifically limit the disclosure. Alternatively or additionally, the degree of association may be limited, and only when it is determined that the two historical search terms are related, the degree of association also needs to be determined by the field of the two historical search terms.

At block 606, the computing device 208 determines the relationship among the plurality of historical search records 210 based on the degree of association between the plurality of historical search records 210. The computing device 208 determines an association relationship among the plurality of historical search records 210 based on the determined degree of association.

In some embodiments, the plurality of historical search records 210 and the association relationship among the plurality of historical search records 210 may be generated by other devices, and the computing device 208 may obtain them from other devices.

In some embodiments, it is possible to extract important keywords and generate user focus point labels according to the user's search and browsing sequence.

Through this method, the association relationship among the plurality of historical search records can be quickly and accurately determined, so that the extended results can be quickly and accurately determined.

Figure 7:
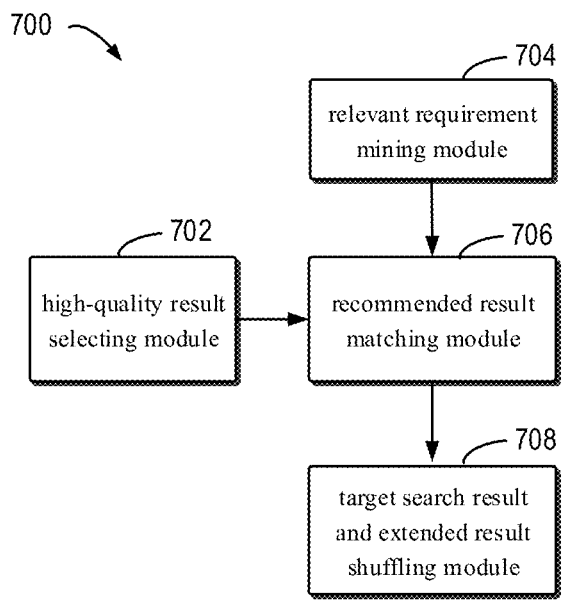
FIG. 7 is a block diagram of an apparatus 700 for searching for content according to embodiments of the disclosure.

FIG. 6 is a flowchart of a method 600 for determining a relationship among the historical search records according to embodiments of the disclosure. FIG. 7 is a block diagram of an apparatus 700 for searching for content according to embodiments of the disclosure.

The apparatus 700 includes a high-quality result selecting module 702, a relevant requirement mining module 704, a recommended result matching module 706, and a search result and recommended result shuffling module 708. After the user submits the search term, the relevant requirement mining module 704 mines relevant requirements based on the original search term. The specific expression form of the relevant requirements may be in the form of search words, keyword combinations, semantic vectors and the like. Based on the mined relevant requirements, the recommended result matching module 706 retrieves the results selected by the high-quality result selecting module 702, and finds resources that meet the relevant requirements as the recommended results. Finally, the search result and recommended result shuffling module 708 shuffles the recommended results and the normal results retrieved by the search engine to generate a final result list, and returns the list to the user.

The relevant requirement mining module 704 mines relevant requirements based on the original search term of the user, and the technical methods used are provided as follows. In a content-based mining method, the search term content is divided into two categories, i.e., search key entity and demand dimension. The search core subject is a subject string that the user can extract from the search sequence during the search process. This subject string can represent the user's core appeal. For example, the search term is "How much is Mercedes-Benz c200", the core subject is "Mercedes-Benz c200", and "how much" is a description of the user's demand for the core subject, which refers to price here. There are various demand dimensions for the core subject of "Mercedes-Benz c200", such as, pictures of Mercedes-Benz c200, performance and fuel consumption of Mercedes-Benz c200, sales of Mercedes-Benz c200 and the like. The idea of content-based mining is to recommend articles of different demand dimensions that are strongly related to the dimension of the search term itself while keeping the key entity unchanged.

When mining the core subject, the historical search term set is obtained from the search log, and the key entity is determined by means of named entity recognition (NER) and high frequency substring statistics. The key entity meets three conditions: 1) the key entity itself has a large number as a search term; 2) the key entity frequently appears as substrings in the plurality of historical search terms; 3) among all the search terms containing the subject string, the ratio of weight of average term of the subject string is relatively high.

When mining the demand dimension, the demand dimension is the attribute of the key product. By gathering the search terms of the same key entity, the remaining character string after removing the key entity is taken as the demand. The different expressions of the demand substrings obtained initially may belong to the same demand, for example, the demands of "how much is the Mercedes-Benz c200" and "the price of the Mercedes-Benz c200" are the same. The demand substrings are aggregated by the clustering method to realize the division of different demand categories. At the same time, according to the co-occurrence associations of different categories, an association matrix among different dimensions is calculated to represent the close relationship among dimensions.

The historical search terms are divided according to key entity and demand information, and based on the mined demand category association matrix, the search terms having strong related requirements are regarded as the relevant extended demand set of the current search term.

Moreover, it is possible to determine extended historical search terms based on the mining method of user search big data. An association graph is generated having the search terms searched by all users as nodes. The edges of the graph include: search behavior (co-occurrence, search terms with the same retrieval result) and field association (same field, different fields with strong correlation). According to the graph-based mining method, the search term set that are strongly related to the current search term is mined as the related extended requirements of the current search term. At the same time, according to the user's search and browsing sequence, core keywords are extracted, and user focus point labels are generated.

The recommended result matching module 706 matches the results that can meet the relevant requirements from a resource library based on the mined relevant requirements. The technical method used includes the follows. For matching based on a search and retrieval system, searching is performed in the retrieval system using the extended search terms to obtain desired results matching the extended search terms, and all the results are merged according to the association strength as the recommended results of the search term. For matching based on user search big data, according to user behaviors such as co-occurrence, the articles associated with the extended search terms are mined as the recommended results of the search term. For matching based on big data of user search and information stream browsing, user's focus point labels are mined and counted from user search and information stream browsing data, articles are recalled through focus point matching as the user's personalized recommended results.

The target search result and extended result shuffling module 708 mainly includes search result scoring, recommended result scoring, and shuffling. For scoring search results, scoring is mainly executed by the fusion model based on historical click distribution, user click rate estimation and other features. The recommended result scoring is based on historical click distribution and user click rate estimation.

When shuffling, the results are sorted in a descending order based on the search result scores and the recommended result scores. At the same time, diversity control is also implemented, including diversity control based on the density of recommended results, and diversity control of the density of recommended results on the same topic.

The high-quality result selecting module 702 scores the file resources based on some basic quality factors, and performs truncation based on the scores to obtain high-quality candidate results. Basic quality factors include: media site scoring, including site scoring based on automatic link analysis method, and site scoring marked by experts; and media author scoring, including author registration marked by experts, author popularity through big data analysis, the author's popularity synthesized based on feedback information from readers such as likes and comments, and the richness of media texts, pictures, and videos.

Figure 8:
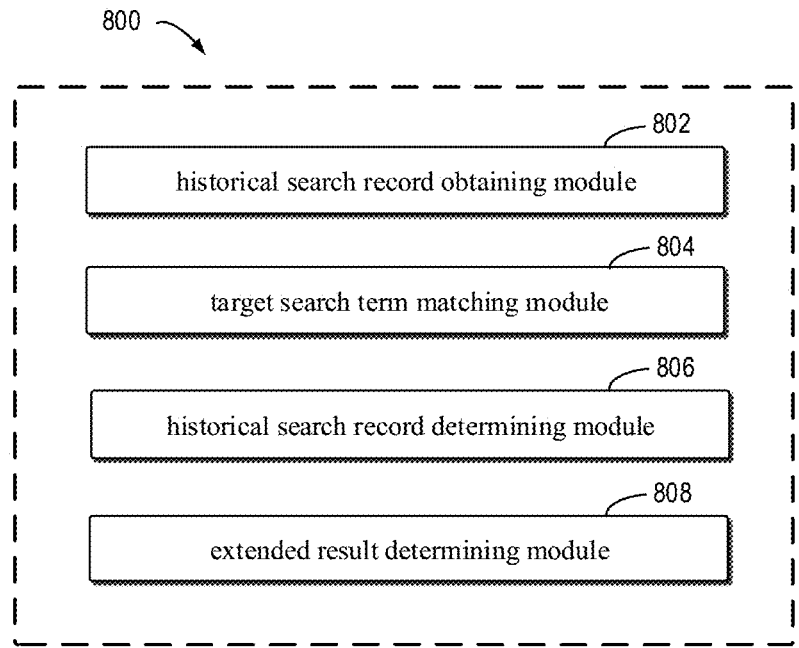
FIG. 8 is a block diagram of an apparatus 800 for searching for content according to embodiments of the disclosure.

FIG. 8 is a block diagram of an apparatus 800 for searching for content according to an embodiment of the disclosure. As illustrated in FIG. 8, the apparatus 800 includes a historical search record obtaining module 802, configured to, in response to receiving a search request for a target search term, obtain a plurality of historical search records related to a plurality of historical search requests, each historical search record including a historical search term targeted by the corresponding historical search request. The apparatus 800 further includes a target search term matching module 804, configured to determine a first historical search record matching the target search term from the plurality of historical search records. The apparatus 800 further includes a historical search record determining module 806, configured to determine a second historical search record associated with the first historical search record from the plurality of historical search records based on a relationship among the plurality of historical search records. The apparatus 800 further includes an extended result determining module 808, configured to determine extended results for the target search term based on search results corresponding to the second historical search record.

In some embodiments, the historical search record obtaining module 802 includes: a first historical search term determining module, configured to determine a set of historical search terms for a set of historical search requests from a search log; an entity determining module, configured to determine a plurality of entities from the set of historical search terms, in which each entity identifies an object associated with the corresponding historical search term; a first key entity determining module, configured to determine a key entity from the plurality of entities based on an occurrence number of each entity in the set of historical search terms; a selecting module, configured to select historical search terms containing the key entity from the set of historical search terms; and a generating module, configured to obtain the plurality of historical search records based on the plurality of historical search terms and the key entity.

In some embodiments, the first key entity determining module includes: a historical search term group determining module, configured to determine a historical search term group from the set of historical search terms, in which each historical search term in the historical search term group contains a single entity; a second historical search term determining module, configured to determine, from the historical search term group, at least one historical search term, in which the single entity in the at least one historical search term has an occurrence number in the historical search term group greater than a first threshold; and a key entity determining module for the single entity, configured to determine the single entity in the at least one historical search term as the key entity.

In some embodiments, the key entity determining module includes: a high frequency entity determining module, configured to determine in the plurality of entities, a high frequency entity having an occurrence number greater than a second threshold based on the occurrence number of each of the plurality of entities in the historical search term set; and a second key entity determining module, configured to determine the high frequency entity as the key entity in response to determining that a weight of the high frequency entity in the corresponding historical search term exceeds a weight threshold, in which the weight indicates an importance of the high frequency entity in the corresponding historical search term.

In some embodiments, the second key entity determining module includes: a position determining module and a length relationship determining module. The position determining module is configured to determine a position of the high frequency entity in the corresponding historical search term. The length relationship determining module is configured to determine a relationship between a length of the high frequency entity and a length of the corresponding historical search term.

In some embodiments, the apparatus 800 further includes: a category determining module and a historical search record relationship determining module. The category determining module is configured to determine categories of the plurality of historical search records based on a plurality of historical search terms in the plurality of historical search records. The historical search record relationship determining module is configured to determine the relationship among the plurality of historical search records based on the categories.

In some embodiments, each historical search record in the plurality of historical search records further includes a key entity, and the category determining module includes: a remaining part determining module, a demand information determining module and a historical search record category determining module. The remaining part determining module is configured to obtain a remaining part of each of the plurality of historical search terms by removing corresponding key entities from the plurality of historical search terms. The demand information determining module is configured to determine demand information associated with the plurality of historical search terms at least based on the remaining parts. The historical search record category determining module is configured to determine the categories of the plurality of historical search records based on the demand information.

In some embodiments, the plurality of historical search records belong to different categories, and the historical search record relationship determining module includes: a first search time or search result determining module, a correlation degree determining module and a correlation degree-based relationship determining module. The first search time or search result determining module is configured to determine a search time or search results for each of the plurality of historical search terms from a search log. The correlation degree determining module is configured to determine a degree of correlation among the categories based on the search time or the search results. The correlation degree-based relationship determining module is configured to determine the relationship among the plurality of historical search records based on the degree of correlation among the categories.

In some embodiments, the apparatus 800 further includes: a second search time or search result configuring module, an association degree determining module and an association degree-based relationship determining module. The second search time or search result configuring module is configured to determine a search time or search results for each of the plurality of historical search terms from the search log. The association degree determining module is configured to determine a degree of association among the plurality of historical search records based on the search time or the search results. The association degree-based relationship determining module is configured to determine the relationship among the plurality of historical search records based on the degree of association among the plurality of historical search records.

In some embodiments, each historical search record in the plurality of historical search records further includes a key entity and a corresponding category of the historical search record, and the historical search record determining module 806 includes: a second category determining module and a second historical search record having a second category determining module. The second category determining module is configured to determine a second category associated with a first category of the first historical search record based on the relationship among the plurality of historical search records. The second historical search record having a second category determining module is configured to determine the second historical search record having a second category from the plurality of historical search records, in which the second historical search record includes the key entity of the first historical search record.

In some embodiments, the historical search record determining module 806 includes: a historical search record set determining module and an association degree-based historical search record determining module. The historical search record set determining module is configured to determine a set of historical search records associated with the first historical search record based on the relationship among the plurality of historical search records, in which there is a degree of association between the first historical search record and each historical search record in the set of historical search records. The association degree-based historical search record determining module is configured to determine the second historical search record from the set of historical search records based on the degree of association.

In some embodiments, the extended result determining module 808 includes: a first search result obtaining module and a search result-targeted extended result determining module for search result. The first search result obtaining module is configured to obtain search results for the historical search term in the second historical search record. The search result-targeted extended result determining module is configured to determine the search results as the extended results.

In some embodiments, the extended result determining module 808 includes: a second search result obtaining module, a partial historical search result determining module and a partial historical search result extending module. The second search result obtaining module is configured to obtain historical search results for the historical search term in the second historical search record. The partial historical search result determining module is configured to determine partial historical search results that have been accessed by a user from the historical search results. The partial historical search result extending module is configured to determine the partial historical search results as the extended results.

In some embodiments, the extended result determining module includes: an information stream module and an information stream-targeted extended result module. The information stream module is configured to obtain an information stream generated when a user performs searching for the historical search term in the second historical search record. The information stream-targeted extended result module is configured to determine the extended results based on the information stream.

In some embodiments, the apparatus 800 further includes at least one of the following: a first providing apparatus and a second providing apparatus. The first providing apparatus is configured to provide the extended results. The second providing apparatus is configured to provide the extended results and target search results for the target search term.

In some embodiments, the second providing apparatus includes: a first score determining module, a second score determining module, a priority determining module and an extended result and search result providing module. The first score determining module is configured to determine a first score for the extended result, in which the first score indicates a degree of relevance between the extended result and the historical search term in the second historical search record. The second score determining module is configured to determine a second score for the target search result, in which the second score indicates a degree of relevance between the target search result and the target search term. The priority determining module is configured to determine priorities of the extended results and the target search results based on the first score and the second score. The extended result and search result providing module is configured to provide the extended results and the target search results based on the priorities.

In some embodiments, the apparatus 800 further includes: a target data source generating module, configured to generate a target data source for obtaining the search results corresponding to the second historical search record.

In some embodiments, the target data source generating module includes: a file score determining module and a target data source file determining module. The file score determining module is configured to determine scores for a plurality of files in a plurality of original data sources, in which the score for each file indicates a quality of the file. The target data source file determining module is configured to determine files each having a score exceeds a score threshold from the plurality of files as files in the target data source.

Figure 9:
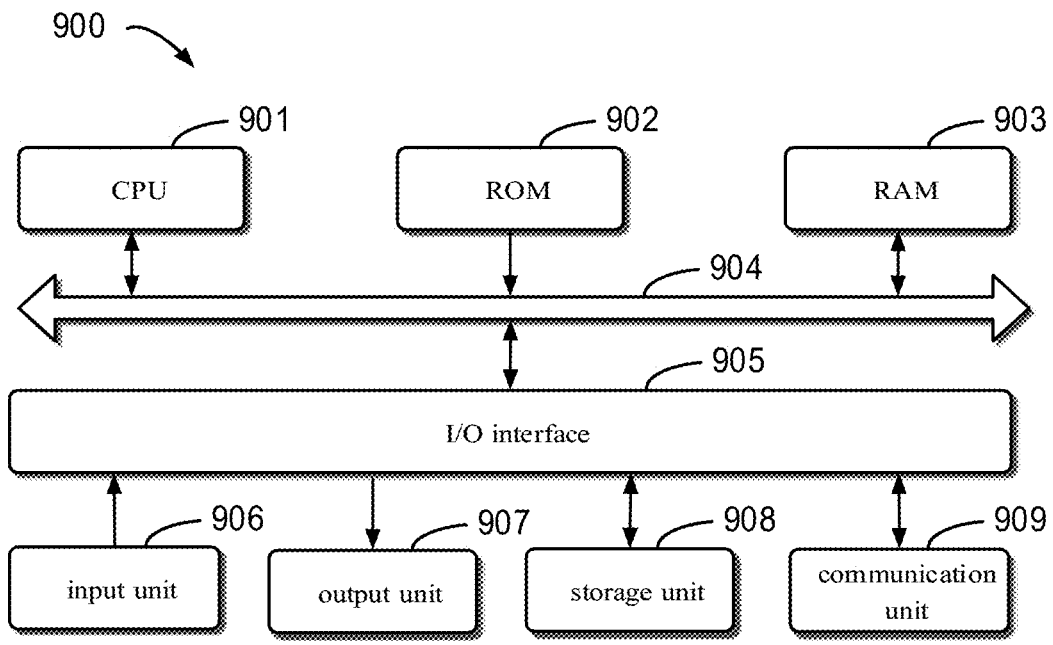
FIG. 9 is a block diagram of a device 900 capable of implementing embodiments of the disclosure.

FIG. 9 is a block diagram of an example electronic device 900 used to implement embodiments of the disclosure. The device 900 may be used to implement the terminal device 204 and the computing device 208 in FIG. 1. As illustrated in FIG. 9, the device 900 includes a computing unit 901 performing various appropriate actions and processes based on computer programs stored in a read-only memory (ROM) 902 or computer programs loaded from the storage unit 908 to a random access memory (RAM) 903. In the RAM 903, various programs and data required for the operation of the device 900 are stored. The computing unit 901, the ROM 902, and the RAM 903 are connected to each other through a bus 904. An input/output (I/O) interface 905 is also connected to the bus 904.

Components in the device 900 are connected to the I/O interface 905, including: an inputting unit 906, such as a keyboard, a mouse; an outputting unit 907, such as various types of displays, speakers; a storage unit 908, such as a disk, an optical disk; and a communication unit 909, such as network cards, modems, and wireless communication transceivers. The communication unit 909 allows the device 900 to exchange information/data with other devices through a computer network such as the Internet and/or various telecommunication networks.

The computing unit 901 may be various general-purpose and/or dedicated processing components with processing and computing capabilities. Some examples of computing unit 901 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 901 executes the various methods and processes described above, such as methods 300, 400, 500 and 600. For example, in some embodiments, the methods 300, 400, 500 and 600 may be implemented as computer software programs, which are tangibly contained in a machine-readable medium, such as the storage unit 908. In some embodiments, part or all of the computer program may be loaded and/or installed on the device 900 via the ROM 902 and/or the communication unit 909. When the computer program is loaded on the RAM 903 and executed by the computing unit 901, one or more steps of the methods 300, 400, 500 and 600 described above may be executed. Alternatively, in other embodiments, the computing unit 901 may be configured to perform the method in any other suitable manner (for example, by means of firmware).

The functions described herein above may be performed, at least in part, by one or more hardware logic components. By way of example but not limitation, hardware logic components may include: a Field Programmable Gate Arrays (FPGAs), Application Specific Integrated Circuits (ASICs), Application Specific Standard Products (ASSPs), System on Chip (SOCs) and Load programmable logic devices (CPLDs).

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

Furthermore, although the operations are depicted in a particular order, this should be understood as requiring that such operations be performed in the shown particular order or in sequential order, or that all illustrated operations be performed to achieve the desired result. Under certain circumstances, multitasking and parallel processing may be advantageous. Likewise, although several specific implementation details are included in the discussion above, these should not be construed as limiting the scope of the disclosure. Certain features that are described in the context of separate embodiments can also be implemented in combination in a single implementation. Conversely, various features that are described in the context of a single implementation can also be implemented in multiple implementations individually or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely example forms for implementing the claims.

What is claimed is:

1. A method for searching for content, comprising:
   in response to receiving a search request for a target search term, obtaining a plurality of historical search records related to a plurality of historical search requests, each historical search record comprising a historical search term targeted by a corresponding historical search request;
   determining a first historical search record matching the target search term from the plurality of historical search records;
   determining a second historical search record associated with the first historical search record from the plurality of historical search records based on a relationship among the plurality of historical search records;
   determining extended results for the target search term based on search results corresponding to the second historical search record; and
   providing the extended results and target search results based on priorities of the extended results and the target search results;
   wherein providing the extended results and target search results based on priorities of the extended results and the target search results comprises:
   determining a first score for the extended result, wherein the first score indicates a degree of relevance between the extended result and the historical search term in the second historical search record;
   determining a second score for the target search result, wherein the second score indicates a degree of relevance between the target search result and the target search term;
   determining priorities of the extended results and the target search results based on the first scores and the second scores; and
   providing the extended results and the target search results based on the priorities.

2. The method of claim 1, further comprising:
   determining categories of the plurality of historical search records based on a plurality of historical search terms in the plurality of historical search records; and
   determining the relationship among the plurality of historical search records based on the categories.

3. The method of claim 2, wherein each historical search record in the plurality of historical search records further comprises a key entity, and determining the categories of the plurality of historical search records comprises:
   obtaining a remaining part of each of the plurality of historical search terms by removing corresponding key entities from the plurality of historical search terms;
   determining demand information associated with the plurality of historical search terms at least based on the remaining parts; and
   determining the categories of the plurality of historical search records based on the demand information.

4. The method of claim 2, wherein the plurality of historical search records belong to different categories, and determining the relationship among the plurality of historical search records comprises:
   determining a search time or search results for each of the plurality of historical search terms from a search log;
   determining a degree of correlation among the categories based on the search time or the search results; and
   determining the relationship among the plurality of historical search records based on the degree of correlation among the categories.

5. The method of claim 1, further comprising:
   determining a search time or search results for each of the plurality of historical search terms from a search log;
   determining a degree of association among the plurality of historical search records based on the search time or the search results; and
   determining the relationship among the plurality of historical search records based on the degree of association among the plurality of historical search records.

6. The method of claim 1, wherein each historical search record in the plurality of historical search records further comprises a key entity and a category of the historical search record, and determining the second historical search record comprises:
   determining a second category associated with a first category of the first historical search record based on the relationship among the plurality of historical search records; and
   determining the second historical search record having the second category from the plurality of historical search records, wherein the second historical search record comprises a key entity of the first historical search record.

7. The method of claim 1, wherein determining the second historical search record comprises:
   determining a set of historical search records associated with the first historical search record based on the relationship among the plurality of historical search records, wherein there is a degree of association between the first historical search record and each historical search record in the set of historical search records; and
   determining the second historical search record from the set of historical search records based on the degree of association.

8. The method of claim 1, wherein obtaining the plurality of historical search records comprises:
   determining a set of historical search terms for a set of historical search requests from a search log;
   determining a plurality of entities from the set of historical search terms, wherein each entity identifies an object associated with the corresponding historical search term;
   determining a key entity from the plurality of entities based on an occurrence number of each entity in the set of historical search terms;
   selecting a plurality of historical search terms containing the key entity from the set of historical search terms; and obtaining the plurality of historical search records based on the plurality of historical search terms and the key entity.

9. The method of claim 8, wherein determining the key entity comprises:
determining a historical search term group from the set of historical search terms, in which each historical search term in the historical search term group contains a single entity;
determining at least one historical search term from the historical search term group, in which the single entity in the at least one historical search term has an occurrence number in the historical search term group greater than a first threshold; and
determining the single entity in the at least one historical search term as the key entity.

10. The method of claim 8, wherein determining the at least one key entity comprises:
determining in the plurality of entities, a high frequency entity having an occurrence number greater than a second threshold based on the occurrence number of each of the plurality of entities in the set of historical search terms; and
determining the high frequency entity as the key entity in response to determining that a weight of the high frequency entity in the corresponding historical search term exceeds a weight threshold, wherein the weight indicates an importance of the high frequency entity in the corresponding historical search term.

11. The method of claim 10, wherein the weight is determined based on at least one of:
a position of the high frequency entity in the corresponding historical search term; and
a relationship between a length of the high frequency entity and a length of the corresponding historical search term.

12. The method of claim 1, wherein determining the extended results for the target search term comprises:
obtaining search results for a historical search term in the second historical search record; and
determining the search results as the extended results.

13. The method of claim 1, wherein determining the extended results for the target search term comprises:
obtaining historical search results for a historical search term in the second historical search record;
determining a part of historical search results that have been accessed by a user from the historical search results; and
determining the part of historical search results as the extended results.

14. The method of claim 1, wherein determining the extended results for the target search term comprises:
obtaining an information stream generated when a user performs searching for the historical search term in the second historical search record; and
determining the extended results based on the information stream.

15. The method of claim 1, further comprising providing the extended results.

16. The method of claim 1, further comprising:
generating a target data source for obtaining search results corresponding to the second historical search record.

17. The method of claim 16, wherein generating the target data source comprises:
determining scores for a plurality of files in a plurality of original data sources, wherein the score for each file indicates a quality of the file; and determining files each having a score exceeds a score threshold from the plurality of files as files in the target data source.

18. An electronic device, comprising:
one or more processors; and
a memory storing one or more programs, wherein when the one or more programs are executed by the one or more processors, the one or more processors are caused to implement a method for searching for content, the method comprising:
in response to receiving a search request for a target search term, obtaining a plurality of historical search records related to a plurality of historical search requests, each historical search record comprising a historical search term targeted by a corresponding historical search request;
determining a first historical search record matching the target search term from the plurality of historical search records;
determining a second historical search record associated with the first historical search record from the plurality of historical search records based on a relationship among the plurality of historical search records;
determining extended results for the target search term based on search results corresponding to the second historical search record; and
providing the extended results and target search results based on priorities of the extended results and the target search results;
wherein providing the extended results and target search results based on priorities of the extended results and the target search results comprises:
determining a first score for the extended result, wherein the first score indicates a degree of relevance between the extended result and the historical search term in the second historical search record;
determining a second score for the target search result, wherein the second score indicates a degree of relevance between the target search result and the target search term;
determining priorities of the extended results and the target search results based on the first scores and the second scores; and
providing the extended results and the target search results based on the priorities.

19. A non-transitory computer-readable storage medium having computer programs stored thereon, wherein when the computer programs are executed by a processor, a method for searching for content is implemented, the method comprising:
in response to receiving a search request for a target search term, obtaining a plurality of historical search records related to a plurality of historical search requests, each historical search record comprising a historical search term targeted by a corresponding historical search request;
determining a first historical search record matching the target search term from the plurality of historical search records;
determining a second historical search record associated with the first historical search record from the plurality of historical search records based on a relationship among the plurality of historical search records;
determining extended results for the target search term based on search results corresponding to the second historical search record; and providing the extended results and target search results based on priorities of the extended results and the target search results;

wherein providing the extended results and target search results based on priorities of the extended results and the target search results comprises:

determining a first score for the extended result, wherein the first score indicates a degree of relevance between the extended result and the historical search term in the second historical search record;

determining a second score for the target search result, wherein the second score indicates a degree of relevance between the target search result and the target search term;

determining priorities of the extended results and the target search results based on the first scores and the second scores; and providing the extended results and the target search results based on the priorities.

* * * * *